June 24, 1969  G. M. GROVER ET AL  3,451,266
VAPOR PRESSURE GAUGE AND CALORIMETER FOR HIGH TEMPERATURES
Filed Dec. 3, 1965

INVENTOR.
GEORGE M. GROVER
CLAUS A. BUSSE
JOSEF BOHDANSKY

United States Patent Office 3,451,266
Patented June 24, 1969

3,451,266
VAPOR PRESSURE GAUGE AND CALORIMETER FOR HIGH TEMPERATURES
George M. Grover, Los Alamos, N. Mex., and Claus A. Busse, Laveno, Varese, and Josef Bohdansky, Taino, Varese, Italy, assignors, by direct and mesne assignments, to the United States of America as represented by the United States Atomic Energy Commission
Filed Dec. 3, 1965, Ser. No. 511,563
Claims priority, application Germany, Feb. 15, 1965, E 28,694
Int. Cl. G01k 17/02
U.S. Cl. 73—190
3 Claims

ABSTRACT OF THE DISCLOSURE

A device that utilizes a heat tube in measuring heat flow and vapor pressure. The heat tube consists of a tube and a capillary wick saturated with a wetting liquid. Attached to the condenser end of the heat tube is a source of measuring gas, a regulating valve and a pressure gauge. A scale to locate the temperature jump surface may be included along the length of the heat tube.

---

In the operation of heat tubes—as described in the Journal of Applied Physics, June 1964, pp. 1990–91—it was shown that residual gases remaining in the tube are transported by the vapor flow to the cooled end (condensation end) of the tube. There is formed a boundary surface gas-vapor in which a perceptible, sharply localized temperature jump occurs, the position of which is manifested also optically, at the respective high operating temperatures, through abrupt transition of the illuminated zone into the succeeding dark zone. The cause for the temperature jump is the absence of condensation heating in the gas-filled space. With a sufficiently large volume of gas and corresponding length of the heat tube, the condensation end of the tube can be kept at any desired degree of cold for the connection of a measuring instrument.

The invention is based on the finding that the phenomenon described can be utilized in two ways, first for the measurement of vapor pressure and second for the measurement of a quantity of heat. Accordingly, the invention is characterized by the operation and utilization of a heat tube as vapor pressure gauge or as calorimeter in which the tube is filled with a corresponding measuring gas.

In case of the employment of the heat tube as vapor pressure gauge, the gas pressure is adjusted so that, at the selected operating temperature of the tube, the initially mentioned temperature-jump surface whose position is instable, becomes stationary, i.e., no longer migrates. The vapor pressure then corresponds to the gas pressure. In utilization of the heat tube as calorimeter, however, the pressure of the measuring gas is kept constant but the heating or cooling of the heat tube is varied. Accordingly, the temperature-jump surface initially adjusted as stationary then moves from the first position of rest into the new position of equilibrium. From the distance of localization of the jump surfaces, readings can be made, optically or by a temperature indicator, of the respective thermal increase or decrease.

For optical reading of the position of the jump surface, it is possible to utilize a linear graduated scale which is calibrated directly in thermal units, e.g., calories per sec., and is located on or next to the heat tube. For electrical measurement, thermocouple elements are utilized whose hot soldering points are located in or on the wall of the heat tube.

The following drawings show examples of construction for heat tubes as vapor pressure gauges or as calorimeters:

Figure 1:
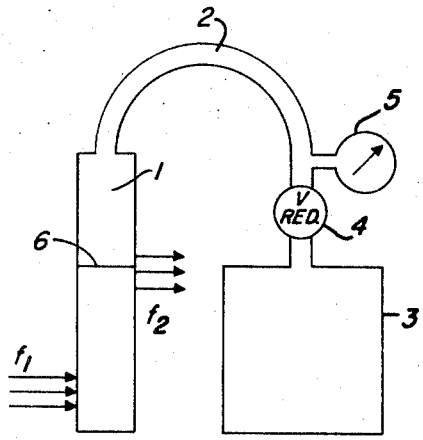
FIGURE 1 is a circuit diagram for measurement of vapor pressure and/or thermal flow.

According to FIGURE 1, a heat tube 1 is connected by way of tubing 2 to a pressurized gas container 3, containing measuring gas, e.g., argon, and is adjustable upward of 25 torr. A reducing valve 4 is arranged in tubing 2 and the pressure gauge 5 is also connected to the tubing. The evaporation end of the heat tube is at the lower end (cf. arrows $f_1$) and the condensation end is at the upper end (cf. arrows $f_2$). The line 6 indicates the temperature jump surface, i.e., the evaporated heat carrier, e.g., Cs-vapor whose evaporation pressure is to be measured, flows in the interior of the tube below the temperature-jump surface and the measuring gas compressed by the vapor phase is located in the interior of the tube above the jump surface.

As already mentioned, the stable position of the jump surfaces is reached under measurement of vapor pressure when vapor pressure and gas pressure are in equilibrium. The heat applied at $f_1$ is maintained at a constant value and corresponds to the temperature at which the vapor pressure is to be measured. In order to maintain the position of the temperature jump surface 6 at a fixed point along the length of the heat tube, it is necessary to adjust the pressure of the measuring gas source 3. This may be accomplished by regulating valve 4. When the equilibrium point is reached, the gas pressure and consequently the vapor pressure may be read on gauge 5.

In calorimetric utilization, however, the pressure of the measuring gas is kept constant which means the temperature will also remain constant because the heat tube is operating at the equilibrium liquid-vapor point. Therefore in order for more heat to be liberated at $f_2$ a greater surface area must be utilized and a longer working length of the heat tube employed which means that the temperature jump surface 6 will move to a higher point along the tube. This displacement of the temperature jump surface corresponds to the new heat flow. From the difference of the two positions of the jump surface, there then results the heat flow absorbed by the tube per unit time.

Figure 2:
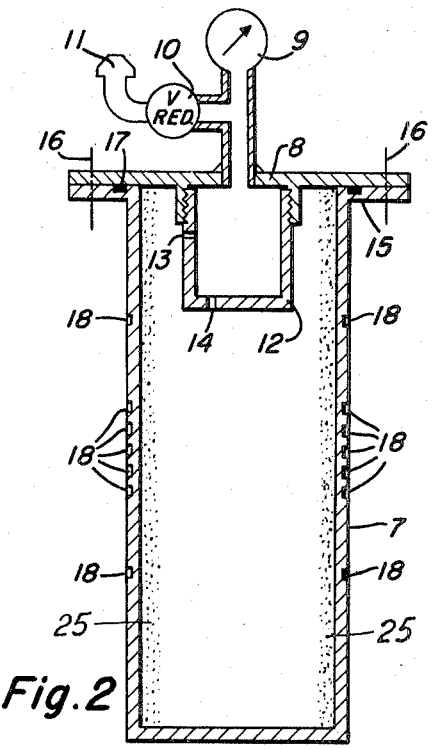
FIGURE 2 is a longitudinal section of heat tube with cooling trap for connection to an adjustable volume of measuring gas.

With the aid of FIGURE 2, the following describes a concrete form of construction of the heat tube for the measurement of vapor pressure or heat flow. The heat tube consists essentially of two components, i.e., the tube 7 closed at the bottom and the cover 8. The tube 7 contains a capillary wick 25, which functions as described in the above-mentioned article. The cover has at the top a stud connection and pressure gauge 9, reducing valve 10 and connection 11 for the tubing of the measuring gas. In the underside of the cover, there is located a cooling trap 12 (baffle) with a pressure-compensation bore 13 and condensation-discharge orifice 14. The cooling trap is removable from the cover, e.g., by screws. The cover is attached to the flange 15 of the heat tube by screws 16 and the annular gasket 17 seals the joint. After removal of the cover, the medium to be investigated can be easily filled into or removed from the heat tube. Tube and cover with cooling trap may consist of, e.g., niobium.

Along the wall of the heat tube, hot soldering points 18 of thermocouple elements are provided with which the position of the temperature-jump surface is measured.

It is also possible to design the heat tube as a closed vessel by filling it with the measuring gas under constant pressure and sealing the tube. Such tubes are suitable for series measurements provided the temperature of the vapor flow varies only within narrow limits.

Figure 3:
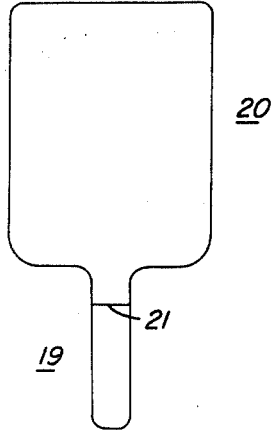
FIGURES 3 and 4 are specific forms of heat tubes for calorimeter operation.
Figure 4:
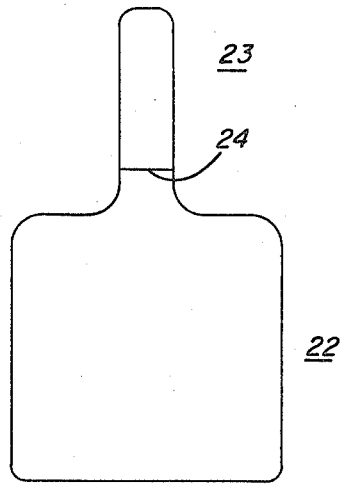

FIGURES 3 an 4 represent closed heat tube calorimeters where the one in FIGURE 3 serves for the measurement of small variations of heat flow whereas the one in FIGURE 4 serves for the measurement of large variations of heat flow.

According to FIGURE 3, the heat tube is designed as a completely closed and sealed vessel which is essentially smaller in diameter at the heated part 19 than at the non-heated part 20. The dimension is adjusted to the pressure of the measuring gas so that the temperature-jump surface between heat carrier and measuring gas represented by line 21 is always located in the narrower part 19 of the tube. This accomplishes that small variations of a low thermal flow produce perceptible variations of the position of the jump surface and therefore can be accurately read.

The heat tube represented in FIGURE 4 shows circumstances different from FIGURE 3, i.e., the heated part 22 of the heat tube has a large volume whereas the non-heated tube part 23 has a very narrow diameter. This accomplishes that the temperature-jump surface 24 does not leave the measuring range under high variations of large thermal flow.

A heat tube as calorimeter can be operated in many different ways. For measurements of liquids or melts, the tube is introduced with the evaporation end into the liquid and/or melt. For measurement on heat-conducting surfaces, the heat tube is equipped with a flexible measuring surface adopted to the surface form and is placed with this surface to the respective wall. Finally, the heat tube can also be connected by flanges with or without bottom to the vessel or tube conducting the heat flow and thus serves for continuous measurement.

In measuring the heat flow from a body, the heat tube is placed so that the body is in contact with the heat tube at $f_1$. The pressure is maintained constant by regulating valve 4 and monitoring gauge 5. The temperature jump surface 6 will move from its original position to some new position which is regarded as the new value of heat flow. A scale along the length of the tube could be calibrated in appropriate thermal units such as calories per second for convenience in reading the heat flow.

Instead of the rigid cooling trap represented in FIGURE 2, it is possible, in heat tubes with a closed system of measuring gas, to divide the gas space from the vapor space by a high-elastic membrane or siphon, both of which permit pressure compensation within given limits. This allows a construction of the heat tube separate from the measuring gas supply.

What is claimed is:

1. A calorimeter comprising an enclosure, a capillary wick means within the enclosure and extending along a portion of the length of the enclosure, a wetting liquid to be heated and evaporated in the enclosure and which saturates the capillary wick means, a measuring gas filling a portion of the enclosure, a measuring gas source connected to the enclosure near one end of the capillary wick means, means to maintain the pressure of the measuring gas at a constant value, and means to locate the temperature jump surface.

2. A device for measuring vapor pressure comprising an enclosure, a capillary wick means within the enclosure and extending along a portion of the length of the enclosure, a wetting liquid that saturates the capillary wick means, a measuring gas source connected to the enclosure near one end of the capillary wick means, means for varying the pressure of the measuring gas, heating means located at the end of the enclosure opposite the measuring gas source, means to locate the position of the temperature jump surface and pressure measuring means to measure the pressure of the measuring gas which corresponds to the pressure of the vapor produced by heating said wetting liquid.

3. The calorimeter of claim 1 including a cooling trap located at the end of the enclosure that contains the measuring gas source.

References Cited

Grover, G. M., Carter, T. P., Erickson, G. F.: "Structures of Very High Thermal Conductance," Journal of Applied Physics, June 1964, pp. 1990–1991.

JAMES J. GILL, *Primary Examiner.*

HERBERT GOLDSTEIN, *Assistant Examiner.*

U.S. Cl. X.R.

73—64.2